(12) United States Patent
Konno et al.

(10) Patent No.: US 9,022,157 B2
(45) Date of Patent: May 5, 2015

(54) MOTORCYCLE

(75) Inventors: Kenji Konno, Wako (JP); Hidekazu Oshima, Wako (JP); Masaomi Yamada, Wako (JP); Yoshiaki Sawano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 13/432,467

(22) Filed: Mar. 28, 2012

(65) Prior Publication Data

US 2012/0247858 A1 Oct. 4, 2012

(30) Foreign Application Priority Data

Mar. 30, 2011 (JP) ................................ 2011-076671

(51) Int. Cl.
| | |
|---|---|
| *B62K 11/04* | (2006.01) |
| *B62K 19/30* | (2006.01) |
| *B62K 19/38* | (2006.01) |
| *B60T 8/32* | (2006.01) |
| *B60T 8/36* | (2006.01) |

(52) U.S. Cl.
CPC ................ *B62K 19/38* (2013.01); *B62K 11/04* (2013.01); *B62K 19/30* (2013.01); *B60T 8/3685* (2013.01)

(58) Field of Classification Search
CPC ........ B62K 11/02; B62K 11/04; B62K 19/30; B62K 19/38; B60T 8/3225; B60T 8/6853; B62L 3/00
USPC ........ 180/219, 311; 303/9.63, 9.64, 9.75, 137
See application file for complete search history.

(56) References Cited

U.S. PATENT DOCUMENTS

| | | | | |
|---|---|---|---|---|
| 4,456,310 | A * | 6/1984 | Hayashi et al. ................. | 303/10 |
| 5,195,717 | A * | 3/1993 | Benz et al. ..................... | 248/638 |
| 8,616,324 | B2 * | 12/2013 | Chipp ............................ | 180/311 |
| 2001/0030464 | A1* | 10/2001 | Kouauki ........................ | 303/121 |
| 2006/0061157 | A1* | 3/2006 | Yokomizo ..................... | 297/214 |
| 2009/0050392 | A1* | 2/2009 | Kakuta ........................... | 180/219 |
| 2009/0242304 | A1* | 10/2009 | Tahara et al. ................. | 180/219 |
| 2010/0163328 | A1* | 7/2010 | Hasegawa ..................... | 180/225 |
| 2010/0243358 | A1* | 9/2010 | Suzuki ........................... | 180/219 |
| 2010/0314188 | A1* | 12/2010 | Goto .............................. | 180/219 |
| 2011/0031054 | A1* | 2/2011 | Matayoshi ..................... | 180/227 |
| 2011/0127829 | A1* | 6/2011 | Hayashi et al. .............. | 303/6.01 |

FOREIGN PATENT DOCUMENTS

JP 2010-76511 A 4/2010

* cited by examiner

*Primary Examiner* — Joseph Rocca
*Assistant Examiner* — Maurice Williams
(74) *Attorney, Agent, or Firm* — Birch, Stewart, Kolasch & Birch, LLP

(57) ABSTRACT

A motorcycle with an ABS module disposed to make it hard to affect the layout of other components while suppressing the influence of vibration on the ABS module. A motorcycle includes rear frames joined to corresponding rear portions of the main frames and extending upwardly and rearwardly at a position below the corresponding seat frames. Front wheel braking members apply a braking force to a front wheel. An ABS module is connected to the front wheel braking means. A seat is supported on the upper portions of the seat frames. The ABS module has at least a portion disposed below the seat and between the seat frames and the rear frames as viewed from the side. The ABS module is suspended and supported by front and rear cross stays spanned between the pair of seat frames via a front elastic members and a rear elastic member.

9 Claims, 5 Drawing Sheets

MOTORCYCLE

CROSS-REFERENCE TO RELATED APPLICATIONS

The present application claims priority under 35 USC 119 to Japanese Patent Application No. 2011-076671 filed Mar. 30, 2011 the entire contents of which are hereby incorporated by reference.

FIELD OF THE INVENTION

The present invention relates to a motorcycle having an antilock brake module.

DESCRIPTION OF BACKGROUND ART

A conventional motorcycle is known that includes a heavy antilock brake system (hereinafter called ABS) module and a battery that are collectively arranged to the right and left and below a seat. More specifically, at a central portion of a vehicle body, thereby achieving a centralization of the mass. See, for example, Japanese Patent Laid-open No. 2010-76511.

In addition, conventional ABS modules are relatively large and are expensive components. Therefore, the ABS modules have mainly been employed by medium- and large-size motorcycles. However, a cost reduction and downsizing of ABS module has been achieved. Therefore, it is desired to apply the ABS module to various motorcycles.

On the other hand, in such a case, vehicle types on which the ABS module is mounted have changed. Therefore, an arrangement of the ABS module is desired while it is hard to affect the layout of other components while protecting the ABS module from external force, vibrations and the like.

SUMMARY AND OBJECTS OF THE INVENTION

Accordingly, it is an object of an embodiment of the present invention to provide a motorcycle in which an ABS module is disposed to make it hard to affect the layout of other components while suppressing the influence of vibration on the ABS module.

To achieve the above object, according to an embodiment of the present invention, a motorcycle includes a main frame (3) extending downwardly and rearwardly from a head pipe (2). A pair of left and right seat frames (15, 15) having respective front ends joined to the corresponding main frame (3) extend rearwardly. Rear frames (16, 16) are joined to corresponding rear portions of the main frame (3) and extend upwardly and rearwardly at a position below the corresponding seat frames (15, 15). Braking means (50) are provided for applying braking force to a wheel (24). An ABS module (60) is connected to the braking means (50). A seat (14) is supported on respective upper portions of the seat frames (15, 15) wherein the ABS module (60) has at least a portion disposed below the seat (14) and between the seat frames (15, 15) and the rear frames (16, 16) as viewed from the side. The ABS module (60) is suspended and supported by a cross stay (61, 71) spanned between the pair of seat frames (15, 15) via elastic members (62, 72).

According to an embodiment of the present invention, the cross stay (61, 71) includes a front cross stay (61) and a rear cross stay (71) installed so as to be spaced apart back and forth from each other. The ABS module (60) has ports (85, 86) connected to corresponding hydraulic pipes (88, 89), at respective positions not overlapping the front cross stay (61) and the rear cross stay (71) as viewed from above.

According to an embodiment of the present invention, the front cross stay (61) has a front hook portion (64), the front hook portion (64) being curved to project rearwardly at an intermediate portion thereof and having a leading end portion (65) bent to face the front, the rear cross stay (71) has a rear hook portion (74), the rear hook portion (74) being curved to project forward at an intermediate portion thereof and having a leading end portion (75) bent to face the rearwardly. Elastic members (62, 72) are provided having respective retaining holes (69, 79) adapted each to engage a corresponding one of the front hook portion (64) and the rear hook portion (74) with respective holding portions (68, 78) holding the ABS module (60) from a circumferential direction.

According to an embodiment of the present invention, the ABS module (60) has a motor (82) and an axis (84) of the motor (82) is oriented in a back and forth direction of the vehicle.

According to an embodiment of the present invention, an engine (7) is installed below the main frame (3) with an air cleaner element (17) installed behind the engine (7) and between the seat frames (15, 15) and the rear frames (16, 16) and rear side covers (35, 35) cover the lateral surfaces of the seat frames (15, 15) and of the rear frames (16, 16) and a rear fender (36) covers a rear wheel (28) from above. The ABS module (60) is disposed behind the air cleaner element (17) and in an air cleaner case (38) defined by the seat (14), both the rear side covers (35, 35) and the rear fender (36).

According to an embodiment of the present invention, even if the motorcycle travels on a road surface such as an off-road or the like where it is subjected to a large shock load, and undergoes external force, vibration applied to the ABS module can be reduced by the buffering action due to the fact that the ABS module is suspended and supported via the elastic members. Thus, the ABS module can be mounted on the off-road vehicle.

The ABS module can be disposed below the seat and in the space portion between the seat frames and the rear frames. Therefore, the ABS module can be disposed so as to make it hard to affect the layout of other components.

According to an embodiment of the present invention, it is possible to make it difficult for the cross stays to hamper the maintenance of piping. Thus, maintenance performance can be improved.

According to an embodiment of the present invention, the ABS module is held by the elastic members from the circumferential direction. Therefore, the influence of vibration on the ABS module can be minimized. The front hook portion and the rear hook portion have their directions reverse to each other. Therefore, even if force is applied to one of the front and rear hook portions in a coming-off direction, such force will be applied to the other in a not-coming-off direction. Thus, the ABS module can be prevented from coming off with a simple structure.

According to an embodiment of the present invention, a small widthwise space is required. Thus, even if the ABS module undergoes anteroposterior vibrations, the rotation of the rotor of the motor is not adversely influenced.

According to an embodiment of the present invention, the ABS module is surrounded by the air cleaner element, the rear side covers and the seat. Therefore, even if external force is applied to the ABS module, the ABS module can be protected by the air cleaner element, the rear side covers and the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will next be described with reference to the drawings.

Figure 1:
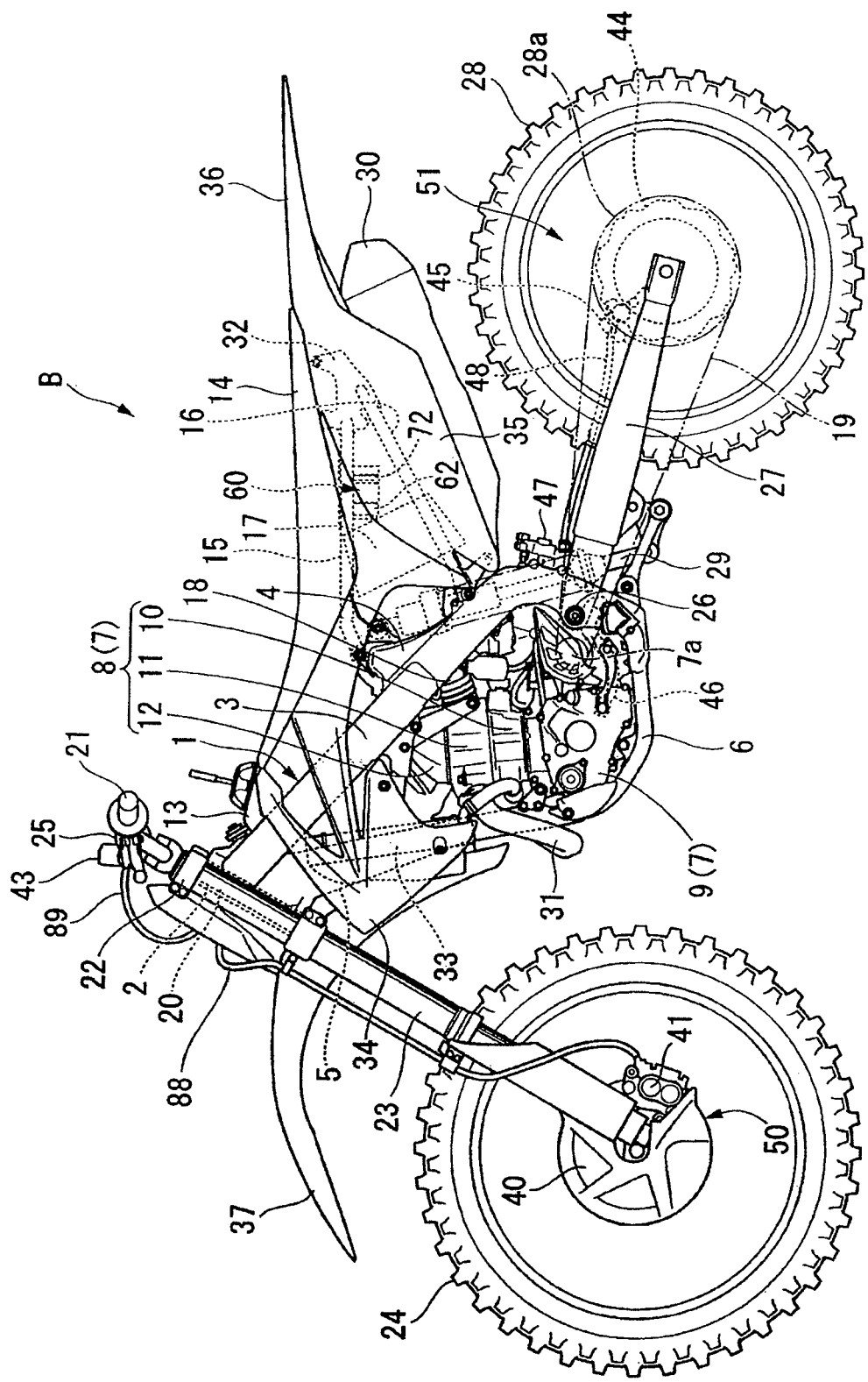
FIG. 1 is a left lateral view of a motorcycle according to an embodiment of the present invention.
Figure 2:
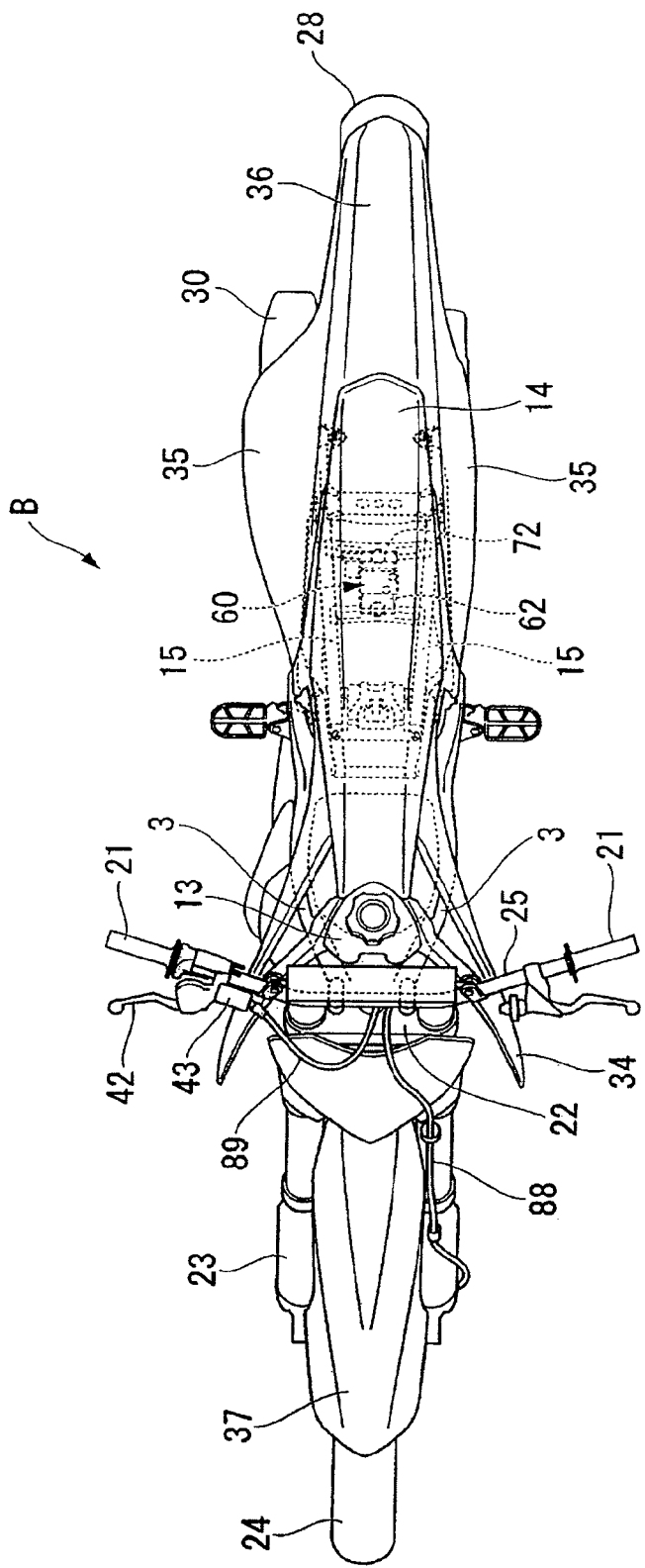
FIG. 2 is a plan view of FIG. 1.

Referring to FIGS. 1 and 2, a body frame of a motorcycle B includes a head pipe 2 installed in a front portion of the vehicle, a pair of left and right main frames 3, 3, a down frame 5 and a pair of left and right lower frames 6, 6. The main frames 3, 3, the down frame 5 and the lower frames 6, 6 are connected to each other in loop form. An engine 7 is disposed inside an area surrounded by these members.

In addition, the respective rear portions of the main frames 3, 3 serve as center frame portions 4, 4 connected to the corresponding lower frames 6, 6. The engine 7 includes a cylinder 8 and a crankcase 9. The head pipe 2 and the down frame 5 are each installed as a single one extending along the center of the vehicle body.

The main frames 3, 3 are attached to the upper portion of the head pipe 2, bend to the right and to the left at a position above the engine 7, and extend obliquely and downwardly and rearwardly. The respective rear portions of the main frames 3, 3 are formed as a pair of left and right center frame portions 4, 4 extending vertically at a position behind the fuel tank 13 and behind the engine 7. The down frame 5 is attached to the lower portion of the head pipe 2, linearly obliquely lowers along the center of the vehicle body at a position in front of the engine 7 and extends downwardly. In addition, the down frame 5 has a lower end joined to the front end portions of the pair of left and right lower frames 6, 6. Each of the lower frames 6 bends downwardly of the engine 7 from the front lower portion of the engine 7 and extends rearward generally linearly. In addition, each of the lower frames 6 has a rear end portion connected to the lower end portion of each of the center frame portions 4.

The engine 7 is of a water-cooled 4-cycle type. A cylinder 8 is installed in the front portion of a crankcase 9 in such an upright state that its cylinder axis is generally vertical. The engine 7 includes a cylinder block 10, a cylinder head 11 and a head cover 12 in the order from bottom to top. The cylinder 8 is made upright, therefore, the engine 7 can be configured to be suitable for an off-roader by reducing the anteroposterior-directional length of the engine 7.

The fuel tank 13 is disposed above the engine 7 and supported on the main frames 3, 3. A seat 14 is disposed immediately behind the fuel tank 13 and supported on seat frames 15, 15. The seat frames 15, 15 have front ends attached to the upper portions of the center frame portions 4, 4 and extend rearwardly. Rear frames 16, 16 are disposed below the seat frames 15, 15 so as to extend upwardly and rearwardly. The rear frames 16, 16 have front ends connected to the center frame portions 4, 4. The rear end portions of the seat frames 15, 15 are connected to the corresponding rear end portions of the rear frames 16, 16 via a bracket 32. An air cleaner element 17 is installed between the seat frames 15, 15 and the rear frames 16, 16 and behind the engine 7. The air cleaner element 17 is adapted to suck air from the rear side of the vehicle body to the cylinder head 11 via air supply equipment 18.

A steering stem 20 is turnably supported by the head pipe 2 and a top bridge 22 is attached to the upper end portion of the steering stem 20. A pair of left and right front forks 23, 23 is supported by the respective left and right end portions of the top bridge 22. A front wheel 24 supported by the lower end portions of the front forks 23, 23 is steered by a handlebar 25 attached to the top bridge 22. In addition, the handlebar 25 is provided with a grip 21 at each of the left and right end portions thereof. The center frame portions 4, 4 swingably supports the corresponding front end portions of rear swing arms 27 by means of a pivot shaft 26.

A rear wheel 28 is supported by the rear end portions of the rear swing arms 27. In addition, the rear wheel 28 is driven by a drive chain 19 wound around a drive sprocket 7a of the engine 7 and around a driven sprocket 28a of the rear wheel 28. This drive chain 19 is wound around along the rear swing arm 27 on the left side of the vehicle body in the back and forth direction. The drive chain 19 is moved up and down in accordance with the vertical swinging movement around the pivot shaft 26. A shock absorber 29 of a rear suspension is installed between each of the rear swing arms 27 and a corresponding one of the rear end portions of the center frame portions 4, 4.

An exhaust pipe 31 is installed in the front portion of the cylinder 8 of the engine 7 so as to lead the exhaust gas of the engine 7 to an exhaust muffler 30. The exhaust pipe 31 extends forward of the crankcase 9 from the front left side of the cylinder head 11 and bends to the right at a position in front of the down frame 5. Then, the exhaust pipe 31 extends rearwardly on the right side of the vehicle body, i.e., on one side of the engine 7, and is connected to the exhaust muffler 30.

A radiator 33 is disposed on the side of and along the down frame 5. Front side covers 34, 34 are installed on the lateral portions of the radiator 33 so as to spread outwardly and in front thereof. Rear side covers 35, 35 covering the corresponding lateral surfaces of the seat frames 15, 15 and of the rear frames 16, 16 are installed continuously with the corresponding front side covers 34, 34. A rear fender 36 continuous with the rear side covers 35, 35 is installed so as to extend rearwardly. The rear fender 36 has a front portion as a separate member installed at a portion straddling between the rear frames 16, 16. A space is defined by a base plate of the air cleaner element 17, the seat 14, both the rear side covers 35, 35 and the front rear fender 36 form an air cleaner case 38. In addition, a front fender 37 is provided.

The front wheel 24 has a front brake disk 40 and a front caliper 41. The front caliper 41 is connected to a master cylinder 43 linked with a brake lever 42 located on the right side of the handlebar 25. The rear wheel 28 has a rear brake disk 44 and a rear caliper 45. The rear caliper 45 is connected via a hose 48 to a master cylinder 47 linked with a brake pedal 46 located on the right side of the vehicle. The brake lever 42, the master cylinder 43, the front caliper 41 and the front brake disk 40 constitute front wheel braking means 50. The brake pedal 46, the master cylinder 47, the rear caliper 45 and the rear brake disk 44 constitute rear wheel braking means 51. An ABS module 60 is connected to the front wheel braking means 50. The ABS module 60 intermittently drives the front caliper 41 so as not to lock the front wheel 24 when the right brake lever 42 is operated.

Figure 3:
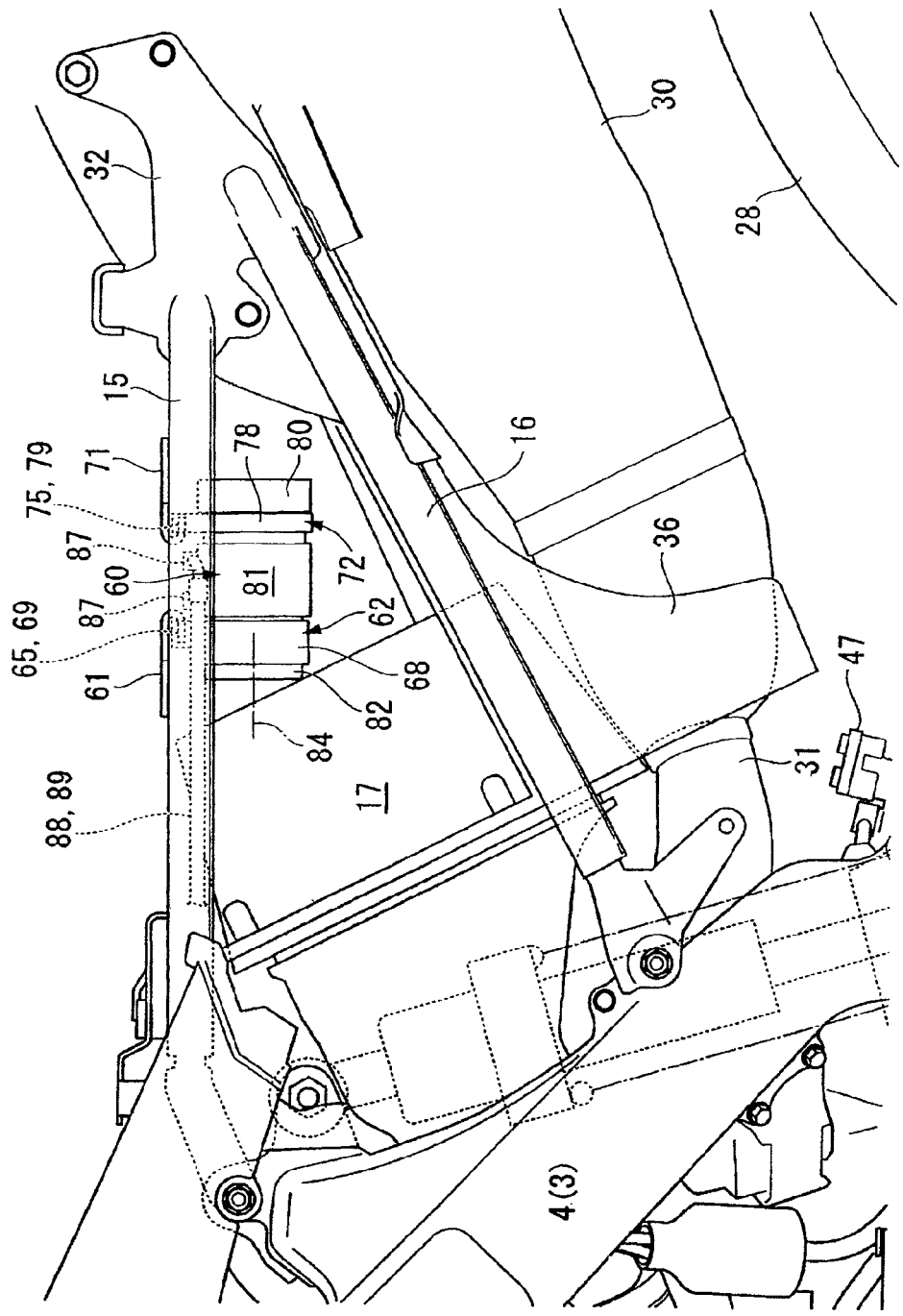
FIG. 3 is a lateral view of an essential portion of an attachment portion of an ABS module.
Figure 4:
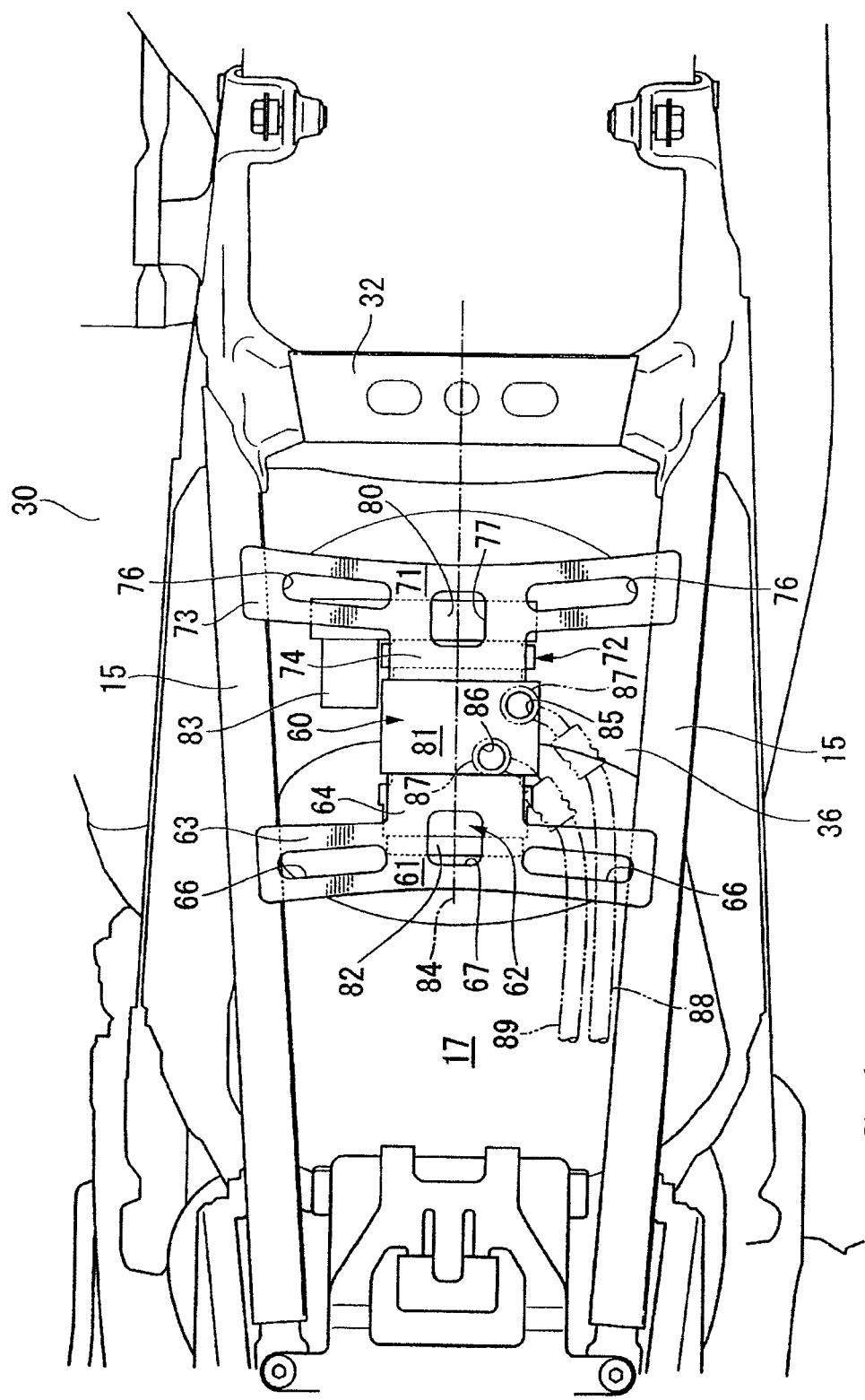
FIG. 4 is a plan view of FIG. 3.
Figure 5:
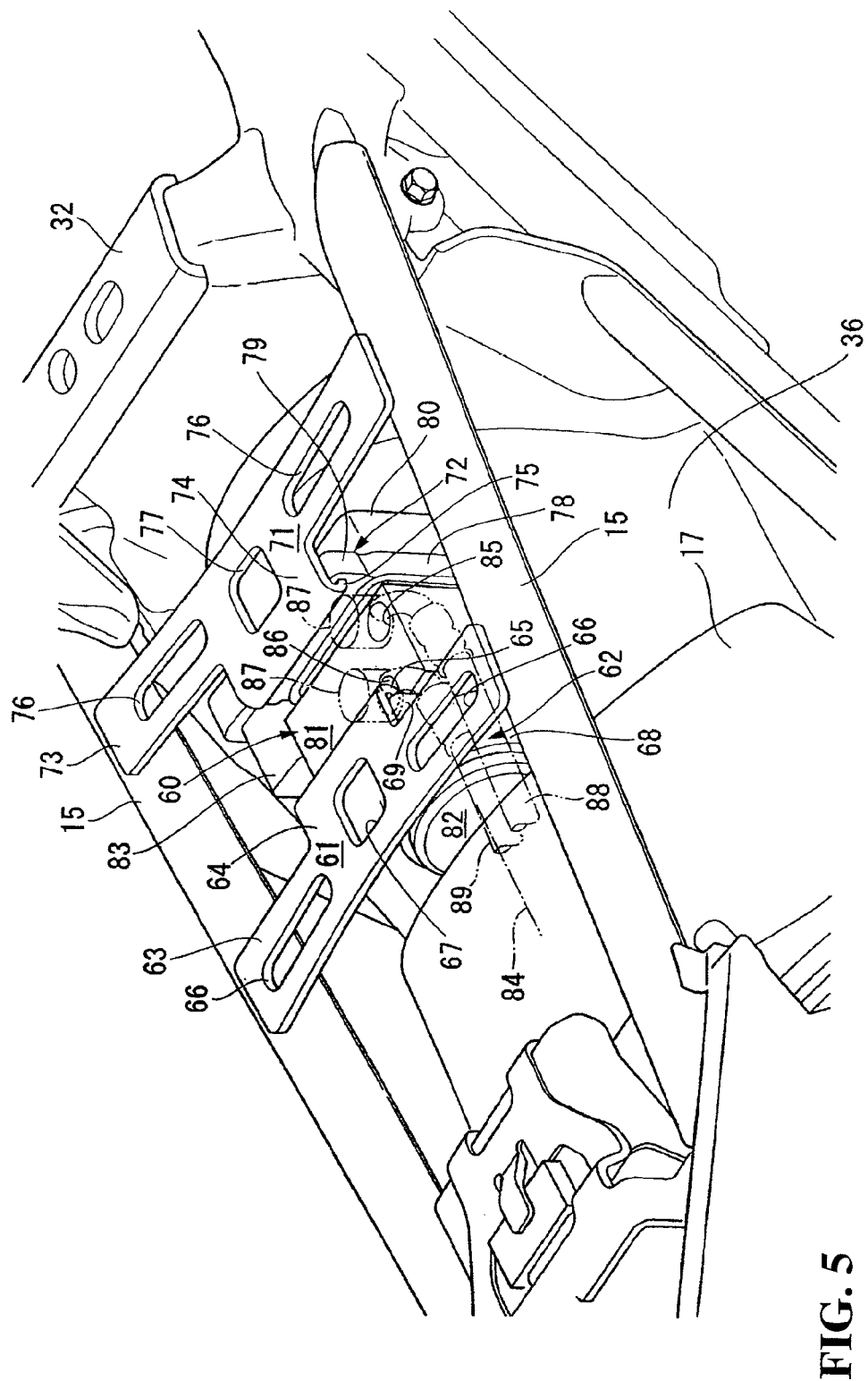
FIG. 5 is an enlarged perspective view of the attachment portion of the ABS module.

Referring to FIGS. 3 to 5, the ABS module 60 is supported by the seat frames 15, 15 and disposed in an area located below the seat 14 and surrounded by both the rear side covers 35, 35. As viewed from the side of the vehicle, the ABS module 60 is installed between the seat frames 15, 15 and the rear frames 16, 16 and behind the air cleaner element 17.

In other words, the ABS module 60 is disposed behind the air cleaner element 17 and in the air cleaner case 38 defined by the seat 14, both the rear side covers 35, 35 and the rear fender 36.

A pair of plate-like cross stays 61 and 71 is disposed in front of the bracket 32 and spanned between the seat frames 15, 15 so as to straddle the upper portions of both the seat frames 15, 15 in the vehicle-width direction. The ABS module 60 is supported by being hung by the pair of cross stays 61 and 71 via front and rear elastic members 62 and 72, respectively.

The pair of cross stays 61 and 71 is composed of a front cross stay 61 attached on the front side and a rear cross stay 71 attached on the rear side of the front cross stay 61 so as to be spaced apart therefrom.

The front cross stay 61 includes a front cross stay main body 63 formed to bend rearward and a front hook portion 64 extending so as to project rearwardly from a rear edge of an intermediate portion of the cross stay main body 63. A leading end portion 65 of the front hook portion 64 is formed curvedly to face the front. The front cross stay main body 63 is formed with opening portions 66, 66 at both end portions thereof and the front hook portion 64 is formed with an opening 67. In this way, weight saving of the front cross stay 61 is achieved.

The rear cross stay 71 includes a rear cross stay main body 73 formed to bend forwardly and a rear hook portion 74 extending to project forwardly from a front edge of an intermediate portion of the rear cross stay main body 73. A leading end portion 75 of the rear hook portion 74 is formed to be curved to face towards the rear. The rear cross stay main body 73 is formed with opening portions 76, 76 at both end portions thereof and the rear hook portion 74 is formed with an opening 77. In this way, a weight saving of the rear cross stay 71 is achieved.

The ABS module 60 includes a rectangular ECU 80, a valve unit 81 and a cylindrical motor 82 which are integrated in this order from the rear side. A socket 83 to be connected with a line connector is provided on the ECU 80 so as to face the front side. An axis 84 of the motor 82 is oriented in the back and forth direction of the vehicle.

The rear elastic member 72 is attached to the circumference of the ECU 80. In addition, the rear elastic member 72 has an ECU holding portion 78 which holds the ECU 80 so as to surround it. The rear elastic member 72 has an upper portion formed with a rear retaining hole 79. The rear retaining hole 79 is inserted, from the back forward, to the leading end portion 75 of the front hook portion 74 and retains it.

The front elastic member 62 is attached to the circumference of the motor 82. In addition, the front elastic member 62 has a motor holding portion 68 which holds the motor 82 so as to surround it. The front elastic member 62 has an upper portion formed with a front retaining hole 69. The front retaining hole 69 is inserted, from the front backward, to the leading end portion 65 of the front hook portion 64 and retains it.

The valve unit 81 is provided in an upper surface thereof with a caliper port 85 communicating with the front caliper 41 and with a cylinder port 86 communicating with the master cylinder 43 of the brake lever 42. Nipples 87, 87 are attached to the caliper port 85 and the cylinder port 86. The caliper port 85 and the cylinder port 86 are connected to the front caliper 41 and the master cylinder 43, respectively, via the corresponding nipples 87, 87 by means of an output side hose 88 and an input side hose 89, respectively, which extend obliquely forward.

According to the embodiment described above, the ABS module 60 is disposed below the seat 14 and between the seat frames 15, 15 and the rear frames 16, 16 as viewed from the side. In addition, the ABS module 60 is supported by the front cross stay 61 and the rear cross stay 71 spanned between the pair of seat frames 15, 15 via the front elastic member 62 and the rear elastic member 72. Therefore, even if the motorcycle travels on a road surface such as an off-road or the like where it is subjected to a large shock load, and undergoes external force, vibration applied to the ABS module 60 can be reduced by the buffering action due to the fact that the ABS module 60 is suspended and supported via the front and rear elastic members 62 and 72.

The ABS module 60 is disposed below the seat 14 and in the space portion between the seat frames 15, 15 and the rear frames 16, 16. Therefore, the ABS module 60 can be disposed so as to make it hard to affect the layout of other components.

The ABS module 60 is provided with the caliper port 85 and the cylinder port 86 at respective positions not overlapping the front cross stay 61 and the rear cross stay 71, the output side hose 88 and the input side hose 89 being connected to the caliper port 85 and the cylinder port 86, respectively. Therefore, it is possible to make it difficult for the front cross stay 61 and the rear cross stay 71 to hamper the maintenance of the output side hose 88 and the input side hose 89. Thus, maintenance performance can be improved.

Further, the ABS module 60 is held by the rear elastic member 72 and the front elastic member 62 from the circumferential direction at the respective positions corresponding to the ECU 80 and the motor 82. Therefore, the influence of vibration on the ABS module 60 can be minimized. The front hook portion 64 and the rear hook portion 74 have their directions reverse to each other. Therefore, even if force is applied to one of the front hook portion 64 and the rear hook portion 74 in a coming-off direction, such force will be applied to the other in a not-coming-off direction. Thus, the ABS module 60 can be prevented from coming off with a simple structure. More specifically, the ABS module 60 may be about to move in the back and forth direction. Even in such a case, the leading end portion 65 of the front hook portion 64 of the front cross stay 61 faces the front and the leading end portion 75 of the rear hook portion 74 of the rear cross stay 71 face the back. In addition, the leading end portions 65 and 75 engage the front retaining hole 69 of the front elastic member 62 and the rear retaining hole 79 of the rear elastic member 72, respectively. Therefore, even if force is applied in any direction of the back and forth direction, one of the front hook portion 64 and the rear hook portion 74 inevitably undergoes the force in a not-coming-off direction. Thus, the ABS module 60 is locked and surely prevented from coming off.

Additionally, the leading end portions 65 and 75 are inserted into and engaged with the front retaining hole 69 and the rear retaining hole 79, respectively. Therefore, even if the ABS module 60 is about to move in a left-right direction, i.e., in the width-direction of the vehicle, the ABS module 60 will surely be held and will not come off.

The ABS module 60 is disposed behind the air cleaner element 17 and in the area surrounded by the seat 14 and both the rear side covers 35. Therefore, even if external force is applied to the ABS module 60, the ABS module 60 can be protected by the air cleanser element 17, the rear side covers 35 and the seat 14.

The axis 84 of the motor 82 of the ABS module 60 is oriented in the back and forth direction of the vehicle, therefore, a small widthwise space is required. Thus, even if the ABS module undergoes anteroposterior vibrations, the rotation of the rotor of the motor 82 is not adversely influenced.

In addition, the present invention is not limited to the embodiment described above. For example, the embodiment describes the case where the ABS module 60 is supported by the front elastic member 62 and the rear elastic member 72. However, the front elastic member 62 and the rear elastic member 72 may have an integral structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a main frame extending downward and rearwardly from a head pipe;
   a pair of left and right seat frames having respective front ends joined to the corresponding main frame and extending rearward;
   rear frames joined to corresponding rear portions of the main frame and extending upwardly and rearwardly at a position below the corresponding seat frames;
   braking means for applying braking force to a wheel;
   an ABS module connected to the braking means; and
   a seat supported on respective upper portions of the seat frames,
   wherein the ABS module has at least a portion disposed below the seat and between the left and right seat frames and the rear frames as viewed from the side, and
   the ABS module is suspended and supported by cross stays spanned between the left and right seat frames and additionally is elastically suspended and supported by elastic members,
   wherein the cross stays include a front cross stay and a rear cross stay, the front cross stay having a front hook portion, the front hook portion being curved to project rearwardly at an intermediate portion thereof and having a leading end portion bent to face the front, and the rear cross stay having a rear hook portion, the rear hook portion being curved to project forward at an intermediate portion thereof and having a leading end portion bent to face rearwardly, and
   the elastic members have respective retaining holes adapted each to engage a corresponding one of the front hook portion and the rear hook portion, and respective holding portions holding the ABS module from a circumferential direction.

2. The motorcycle according to claim 1,
   wherein the front cross stay and the rear cross stay are installed so as to be spaced apart, back and forth from each other, and
   the ABS module has ports connected to corresponding hydraulic pipes, at respective positions not overlapping the front cross stay and the rear cross stay as viewed from above.

3. The motorcycle according to claim 2, and further comprising:
   an engine installed below the main frame;
   an air cleaner element installed behind the engine and between the left and right seat frames and the rear frames;
   rear side covers covering the lateral surfaces of the left and right seat frames and of the rear frames; and
   a rear fender covering a rear wheel from above;
   wherein the ABS module is disposed behind the air cleaner element and in an air cleaner case defined by the seat, both the rear side covers and the rear fender.

4. The motorcycle according to claim 1,
   wherein the ABS module has a motor and an axis of the motor is oriented in a back and forth direction of the vehicle.

5. The motorcycle according to claim 4, and further comprising:
   an engine installed below the main frame;
   an air cleaner element installed behind the engine and between the left and right seat frames and the rear frames;
   rear side covers covering the lateral surfaces of the left and right seat frames and of the rear frames; and
   a rear fender covering a rear wheel from above;
   wherein the ABS module is disposed behind the air cleaner element and in an air cleaner case defined by the seat, both the rear side covers and the rear fender.

6. The motorcycle according to claim 1, and further comprising:
   an engine installed below the main frame;
   an air cleaner element installed behind the engine and between the left and right seat frames and the rear frames;
   rear side covers covering the lateral surfaces of the left and right seat frames and of the rear frames; and
   a rear fender covering a rear wheel from above;
   wherein the ABS module is disposed behind the air cleaner element and in an air cleaner case defined by the seat, both the rear side covers and the rear fender.

7. The motorcycle according to claim 1, wherein the front hook and the rear hook extend in directions reversed from each other wherein a force applied to one of the front hook portion and the rear hook portion to disengage one of the front hook portion and the rear hook portion acts as a force to engage one of the rear hook portion and the front hook portion.

8. The motorcycle according to claim 7, wherein the front hook engaged in the respective retaining hole in a corresponding elastic member and the rear hook engaged in a respective retaining hole in a corresponding elastic member are moved by the force in an opposite direction to ensure retaining the ABS relative to the left and right seat frames.

9. A motorcycle comprising:
   a main frame extending downward and rearwardly from a head pipe;
   a pair of left and right seat frames having respective front ends joined to the corresponding main frame and extending rearward;
   rear frames joined to corresponding rear portions of the main frame and extending upwardly and rearwardly at a position below the corresponding seat frames;
   braking means for applying braking force to a wheel;

an ABS module connected to the braking means; and
a seat supported on respective upper portions of the seat frames,
wherein the ABS module has at least a portion disposed below the seat and between the left and right seat frames and the rear frames as viewed from the side, and
the ABS module is suspended and supported by cross stays spanned between the left and right seat frames and additionally is elastically suspended and supported by elastic members, said motorcycle further comprising:
an engine installed below the main frame;
an air cleaner element installed behind the engine and between the left and right seat frames and the rear frames;
rear side covers covering the lateral surfaces of the left and right seat frames and of the rear frames; and
a rear fender covering a rear wheel from above;
wherein the ABS module is disposed behind the air cleaner element and in an air cleaner case defined by the seat, both the rear side covers and the rear fender.

* * * * *